(12) United States Patent
Yin et al.

(10) Patent No.: US 10,920,761 B2
(45) Date of Patent: Feb. 16, 2021

(54) PUMP-VALVE INTEGRATED MECHANISM

(71) Applicant: Zhejiang Ruiwei Electromechanical Technology Co., Ltd., Wenzhou (CN)

(72) Inventors: Zujun Yin, Guangzhou (CN); Ruiwei Chi, Wenzhou (CN); Yang Liu, Wenzhou (CN); Jiapeng Zhang, Wenzhou (CN); Zhuo Xu, Wenzhou (CN); Guizhi Qin, Wenzhou (CN)

(73) Assignee: ZHEJIANG RUIWEI ELECTROMECHANICAL TECHNOLOGY CO., LTD., Wenzhou (CN)

( * ) Notice: Subject to any disclaimer, the term of this patent is extended or adjusted under 35 U.S.C. 154(b) by 3 days.

(21) Appl. No.: 16/508,304

(22) Filed: Jul. 11, 2019

(65) Prior Publication Data

US 2020/0158101 A1 May 21, 2020

(30) Foreign Application Priority Data

Nov. 19, 2018 (CN) ..................... 2018 2 1897952 U

(51) Int. Cl.
*F04B 39/10* (2006.01)
*F04B 39/00* (2006.01)
(Continued)

(52) U.S. Cl.
CPC .......... *F04B 39/10* (2013.01); *F04B 39/0027* (2013.01); *F04B 49/22* (2013.01); *F16K 15/18* (2013.01); *F16K 31/0603* (2013.01); *F04B 2205/16* (2013.01); *Y10T 137/86027* (2015.04); *Y10T 137/86051* (2015.04)

(58) Field of Classification Search
CPC ..... Y10T 137/86027; Y10T 137/86051; F04B 39/10; F04B 2205/16; F04B 39/0027; F04B 49/22; F16K 15/18; F16K 31/0603
See application file for complete search history.

(56) References Cited

U.S. PATENT DOCUMENTS

| | | | | | |
|---|---|---|---|---|---|
| 2,279,243 | A | * | 4/1942 | Parsons | ............... F16K 31/0651 251/129.21 |
| 4,705,210 | A | * | 11/1987 | Graser | ................ F02M 51/065 239/585.3 |

(Continued)

*Primary Examiner* — Marina A Tietjen
*Assistant Examiner* — Frederick D Soski
(74) *Attorney, Agent, or Firm* — Bayramoglu Law Offices LLC

(57) ABSTRACT

A pump-valve integrated mechanism includes an air pump driven by a power source. A main air channel provided inside the valve base is connected to the air pump and has a decompression structure. The main air channel is connected to an air inflation structure which includes a branch air channel and an air nozzle. A check valve is provided inside the branch air channel. The branch air channel between the check valve and the air nozzle is provided with an air deflation hole. An electromagnetic valve is provided between the air nozzle, the air deflation hole, and the check valve. During air inflation, the electromagnetic valve controls the check valve to become connected to the air nozzle, and the air deflation hole is closed. During air deflation, the electromagnetic valve controls the air nozzle to become connected to the air deflation hole and the check valve is closed.

8 Claims, 5 Drawing Sheets

A-A

(51) Int. Cl.
    *F04B 49/22*     (2006.01)
    *F16K 15/18*     (2006.01)
    *F16K 31/06*     (2006.01)

(56) References Cited

U.S. PATENT DOCUMENTS

| | | | | |
|---|---|---|---|---|
| 5,085,402 A * | 2/1992 | O'Dell | F16K 31/0655 | 251/129.15 |
| 5,150,879 A * | 9/1992 | Mullally | F02K 9/58 | 251/129.15 |
| 5,158,263 A * | 10/1992 | Shimizu | F16K 31/0651 | 251/129.17 |
| 5,199,459 A * | 4/1993 | Mullally | F02K 9/58 | 137/613 |
| 5,445,189 A * | 8/1995 | Yamamuro | B60T 8/36 | 137/625.65 |
| 5,450,876 A * | 9/1995 | Reinicke | F16K 31/0651 | 137/312 |
| 5,651,530 A * | 7/1997 | Krimmer | F16K 31/0606 | 251/129.21 |
| 5,685,493 A * | 11/1997 | Grytz | F02M 51/061 | 239/585.1 |
| 5,848,780 A * | 12/1998 | Miller | F16K 31/0651 | 251/129.21 |
| 5,868,375 A * | 2/1999 | Reinicke | F16K 31/0624 | 251/129.06 |
| 5,897,098 A * | 4/1999 | Nishinosono | F16H 61/0251 | 251/129.08 |
| 5,921,281 A * | 7/1999 | Takayama | B60G 17/056 | 137/625.26 |
| 5,992,461 A * | 11/1999 | Gilmore | H01F 7/081 | 137/625.65 |
| 5,996,910 A * | 12/1999 | Takeda | F02M 51/0614 | 239/585.1 |
| 5,996,911 A * | 12/1999 | Gesk | F02M 51/0614 | 239/585.1 |
| 6,000,628 A * | 12/1999 | Lorraine | F02M 51/0671 | 239/87 |
| 6,076,802 A * | 6/2000 | Maier | F02M 51/0682 | 251/129.21 |
| 6,089,467 A * | 7/2000 | Fochtman | F02M 21/0266 | 239/5 |
| 6,109,543 A * | 8/2000 | Bright | F02M 51/005 | 137/341 |
| 6,213,413 B1 * | 4/2001 | Kojima | F02M 51/0667 | 239/533.11 |
| 6,374,624 B1 * | 4/2002 | Cholkeri | F16K 31/0651 | 251/129.21 |
| 6,425,409 B1 * | 7/2002 | Cross | F16K 31/0606 | 137/15.18 |
| 6,467,495 B2 * | 10/2002 | Shost | F02M 25/0836 | 137/15.18 |
| 6,511,042 B1 * | 1/2003 | Schulz | F02M 25/0836 | 251/129.16 |
| 6,548,837 B1 * | 4/2003 | Vaz De Azevedo | F02M 25/0836 | 123/520 |
| 6,588,726 B2 * | 7/2003 | Osterhart | F16F 9/348 | 251/129.02 |
| 6,616,073 B2 * | 9/2003 | Sugiyama | F02M 51/0682 | 239/585.1 |
| 6,679,435 B1 * | 1/2004 | Noller | F02M 51/061 | 239/5 |
| 6,810,931 B2 * | 11/2004 | Graffin | B67C 3/26 | 141/301 |
| 6,863,255 B2 * | 3/2005 | Watanabe | F16K 31/0655 | 251/129.21 |
| 7,458,395 B2 * | 12/2008 | Haynes | F16K 31/0606 | 137/625.65 |
| 7,497,391 B2 * | 3/2009 | Reiter | F02M 51/0682 | 219/616 |
| 7,513,445 B2 * | 4/2009 | Ricco | F02M 47/027 | 239/585.3 |
| 7,520,449 B2 * | 4/2009 | Matsuo | F02M 51/005 | 239/585.5 |
| 7,581,711 B2 * | 9/2009 | Akabane | F02M 51/0682 | 251/129.21 |
| 7,712,686 B2 * | 5/2010 | Yamamoto | F02M 51/0614 | 239/585.1 |
| 7,774,126 B2 * | 8/2010 | Abe | F02D 41/20 | 701/104 |
| 8,662,472 B2 * | 3/2014 | Suzuki | F02M 61/188 | 251/129.21 |
| 8,684,036 B1 * | 4/2014 | Satoda | F16K 1/14 | 137/625.33 |
| 8,727,308 B2 * | 5/2014 | Shukhmin | F16K 31/0682 | 251/129.21 |
| 8,973,895 B2 * | 3/2015 | Thomas | F01N 3/2066 | 251/129.21 |
| 8,991,784 B2 * | 3/2015 | Jurgens | F16K 31/06 | 251/129.21 |
| 9,027,905 B2 * | 5/2015 | Matsusaka | F16K 31/0651 | 251/129.21 |
| 9,033,264 B2 * | 5/2015 | Stier | F02M 51/0667 | 239/585.1 |
| 9,458,612 B2 * | 10/2016 | Thomas | E03C 1/057 | |
| 10,471,868 B2 * | 11/2019 | Wheeler | B60N 2/0228 | |
| 10,473,228 B2 * | 11/2019 | Hutchins | F16K 31/0627 | |
| 10,655,748 B2 * | 5/2020 | Ho | F16K 31/082 | |
| 2001/0015418 A1 * | 8/2001 | Reiter | F02M 61/168 | 251/129.21 |
| 2001/0017326 A1 * | 8/2001 | Fochtman | F02M 21/0263 | 239/585.1 |
| 2001/0017327 A1 * | 8/2001 | Fochtman | F02M 51/0671 | 239/585.4 |
| 2002/0047054 A1 * | 4/2002 | Dallmeyer | F02M 61/18 | 239/585.1 |
| 2002/0074532 A1 * | 6/2002 | Rovira | F16K 31/0655 | 251/129.21 |
| 2002/0084343 A1 * | 7/2002 | Dallmeyer | F02M 51/0682 | 239/5 |
| 2002/0084344 A1 * | 7/2002 | Dallmeyer | F02M 61/165 | 239/5 |
| 2002/0100822 A1 * | 8/2002 | Oliver | F02M 51/0675 | 239/585.4 |
| 2003/0132411 A1 * | 7/2003 | Dallmeyer | F02M 61/168 | 251/129.21 |
| 2003/0146400 A1 * | 8/2003 | Mueller | F02M 51/0685 | 251/48 |
| 2003/0189183 A1 * | 10/2003 | Noller | F02M 51/0667 | 251/129.21 |
| 2005/0258385 A1 * | 11/2005 | Miller | F02M 21/0266 | 251/129.21 |
| 2006/0022161 A1 * | 2/2006 | Yamashita | F16K 31/0675 | 251/129.21 |
| 2006/0186365 A1 * | 8/2006 | Hirayama | F02M 51/005 | 251/129.21 |
| 2006/0192163 A1 * | 8/2006 | Yamamoto | F02M 51/0682 | 251/129.21 |
| 2006/0214126 A1 * | 9/2006 | Kimble | F16K 31/0655 | 251/129.21 |
| 2006/0231785 A1 * | 10/2006 | Hans | F02M 21/0254 | 251/129.21 |
| 2006/0273274 A1 * | 12/2006 | Nagaoka | F02M 51/0675 | 251/129.18 |
| 2007/0023723 A1 * | 2/2007 | Magri | F16K 31/0655 | 251/129.21 |
| 2007/0057218 A1 * | 3/2007 | Kuno | F16K 31/0606 | 251/129.21 |
| 2008/0179556 A1 * | 7/2008 | Lasa | F16K 31/402 | 251/129.21 |
| 2008/0217437 A1 * | 9/2008 | Vanden Berghe | B05B 1/3053 | 239/583 |
| 2008/0237520 A1 * | 10/2008 | Sugiyama | F02M 51/0685 | 251/129.21 |
| 2008/0245427 A1 * | 10/2008 | Williams | F16K 31/0627 | 137/625.25 |
| 2009/0078901 A1 * | 3/2009 | Guirado Tristan | H01F 5/04 | 251/129.21 |

(56) References Cited

U.S. PATENT DOCUMENTS

| | | | | |
|---|---|---|---|---|
| 2009/0108107 A1* | 4/2009 | Kitagawa | ............. | F02M 61/168 |
| | | | | 239/585.4 |
| 2009/0200405 A1* | 8/2009 | Yoshimaru | ......... | F02M 51/0685 |
| | | | | 239/585.1 |
| 2012/0090708 A1* | 4/2012 | Usui | .................... | F02M 37/043 |
| | | | | 137/565.16 |
| 2014/0232155 A1* | 8/2014 | Bocsanyi | ................. | A47C 4/54 |
| | | | | 297/284.6 |
| 2014/0261716 A1* | 9/2014 | Van Weelden | .......... | F04C 14/18 |
| | | | | 137/12 |
| 2015/0096633 A1* | 4/2015 | Pifer | ................... | F16K 31/0624 |
| | | | | 137/599.11 |
| 2017/0234338 A1* | 8/2017 | Spielvogel | ................ | F02N 7/06 |
| | | | | 60/629 |
| 2017/0254305 A1* | 9/2017 | Lucas | .................. | F02M 59/466 |
| 2017/0254306 A1* | 9/2017 | Lucas | .................... | F02M 59/48 |
| 2017/0255209 A1* | 9/2017 | Johnson | .................. | A61L 2/035 |
| 2017/0306590 A1* | 10/2017 | Kondo | .................... | F16H 39/42 |
| 2018/0045196 A1* | 2/2018 | Rampen | ............. | F16K 37/0041 |
| 2018/0055230 A1* | 3/2018 | Cheng | ..................... | B60N 2/66 |
| 2018/0072199 A1* | 3/2018 | Strumolo | ............. | B60N 2/0244 |
| 2018/0105080 A1* | 4/2018 | Dry | ........................ | B60N 2/914 |
| 2018/0335042 A1* | 11/2018 | Lin | ....................... | F04D 27/008 |
| 2018/0339625 A1* | 11/2018 | Uno | ........................ | B60N 2/90 |
| 2019/0070907 A1* | 3/2019 | Dudar | .................. | B60C 23/003 |
| 2019/0105225 A1* | 4/2019 | Brenner | ................. | A61H 9/005 |
| 2020/0002141 A1* | 1/2020 | Dissing | .............. | E04F 21/0023 |
| 2020/0263646 A1* | 8/2020 | Perry | .................. | F02M 59/361 |

* cited by examiner

A-A

B-B

PUMP-VALVE INTEGRATED MECHANISM

CROSS REFERENCE TO RELATED APPLICATIONS

This application is based upon and claims priority to Chinese Patent Application No. 201821897952.8, filed on Nov. 19, 2018 the entire contents of which are incorporated herein by reference.

TECHNICAL FIELD

The present invention relates to the improvements in the field of air pumps, particularly to a pump-valve integrated mechanism.

BACKGROUND

To make the automobile seat more comfortable, a lumbar support of the automobile seat is usually provided with an airbag and a pump-valve system to inflate and deflate the airbag. However, an air pump and a control valve of the pump-valve system are arranged in a vertical direction, resulting in a relatively larger installation room occupation and a complicated assembling. Besides, since the control valve merely controls the on and off in a simple way, it is difficult to flexibly switch between the inflation mode and deflation mode of the airbag, which lowers comfort level in using the airbag.

SUMMARY

The technical problems to be solved by the present invention is to overcome drawbacks of the prior art by providing a pump-valve integrated mechanism with a reasonable arrangement and a compact structure.

To solve the above-mentioned technical problems, the present invention adopts the following technical solutions: the pump-valve integrated mechanism includes an air pump, the air pump is driven by a power source, wherein the air pump is connected to a valve base, a main air channel is provided inside the valve base, the main air channel of the valve base is connected to the air pump, and the main air channel is provided with a decompression structure. The main air channel is connected to an air inflation structure. The air inflation structure includes a branch air channel and an air nozzle. An inner end of the branch air channel is connected to the main air channel. An outer end of the branch air channel is connected to the air nozzle. A check valve is provided inside the branch air channel. The branch air channel between the check valve and the air nozzle is provided with an air deflation hole, and an electromagnetic valve is provided between the air nozzle, the air deflation hole, and the check valve. During air inflation, the electromagnetic valve controls the check valve to become connected to the air nozzle, and the air deflation hole is closed. During air deflation, the electromagnetic valve controls the air nozzle to become connected to the air deflation hole, and the check valve is closed.

At least two air inflation structures are provided.

The valve base is provided on a side of the air pump.

The power source is a motor. The motor is provided above the air pump with a driving connection. Correspondingly, the motor is provided with a PCBA (Printed Circuit Board Assembly), and the PCBA is provided with a connecting pin.

The main air channel of the valve base is connected to the air pump through a U-shaped air pipe.

The decompression structure is a decompression hole provided on the main air channel. The decompression hole is correspondingly provided with a decompression valve.

The electromagnetic valve includes a valve rod. The valve rod is movably provided inside the branch air channel, and a gap is provided between the valve rod and the branch air channel. Two ends of the valve rod are respectively provided with an upper sealing gasket and a lower sealing gasket. The upper sealing gasket is matched with the air deflation hole. The lower sealing gasket is matched with the check valve.

A soundproof foam is provided inside the decompression hole.

The present invention has the following advantages: the improved pump-valve integrated mechanism has a reasonable arrangement and a compact structure and is capable of quickly and flexibly inflating and deflating the airbag of the lumbar support.

BRIEF DESCRIPTION OF THE DRAWINGS

The embodiments of the present invention will be described in detail hereinafter with reference to the following drawings.

DETAILED DESCRIPTION OF THE EMBODIMENTS

Figure 1:
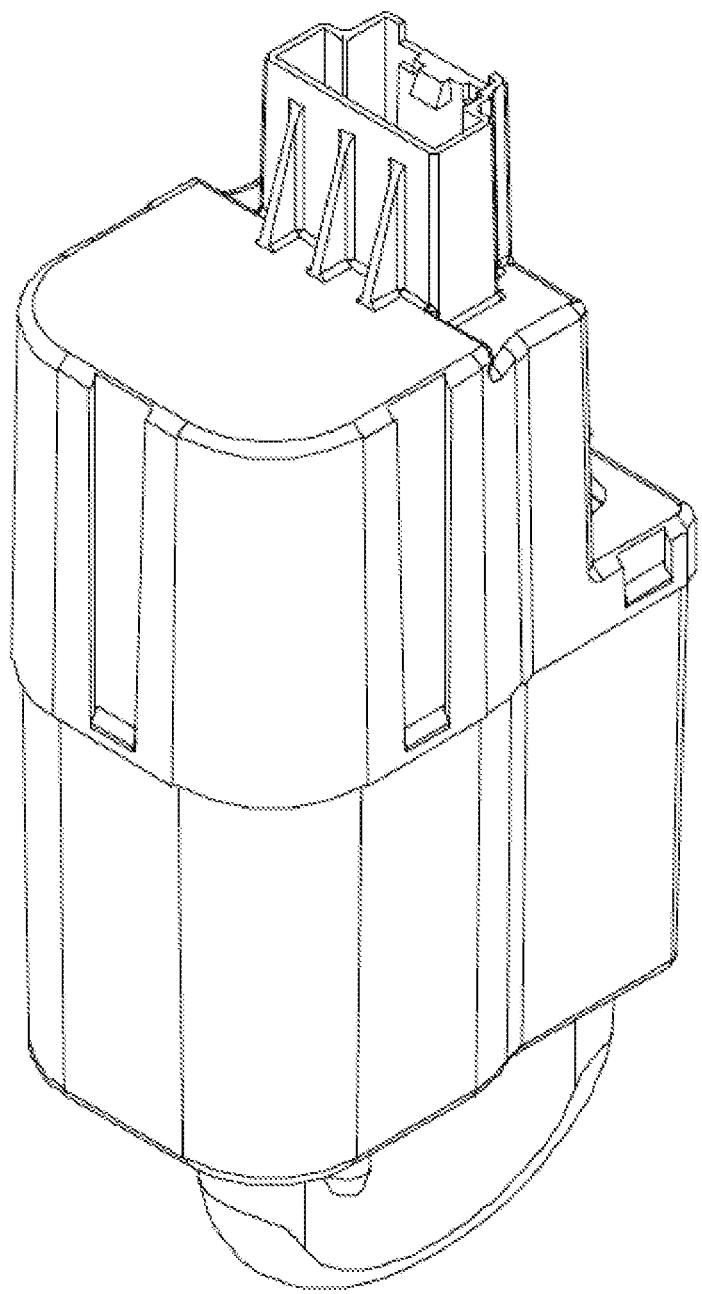
FIG. 1 is a structural schematic diagram of the present invention.
Figure 2:
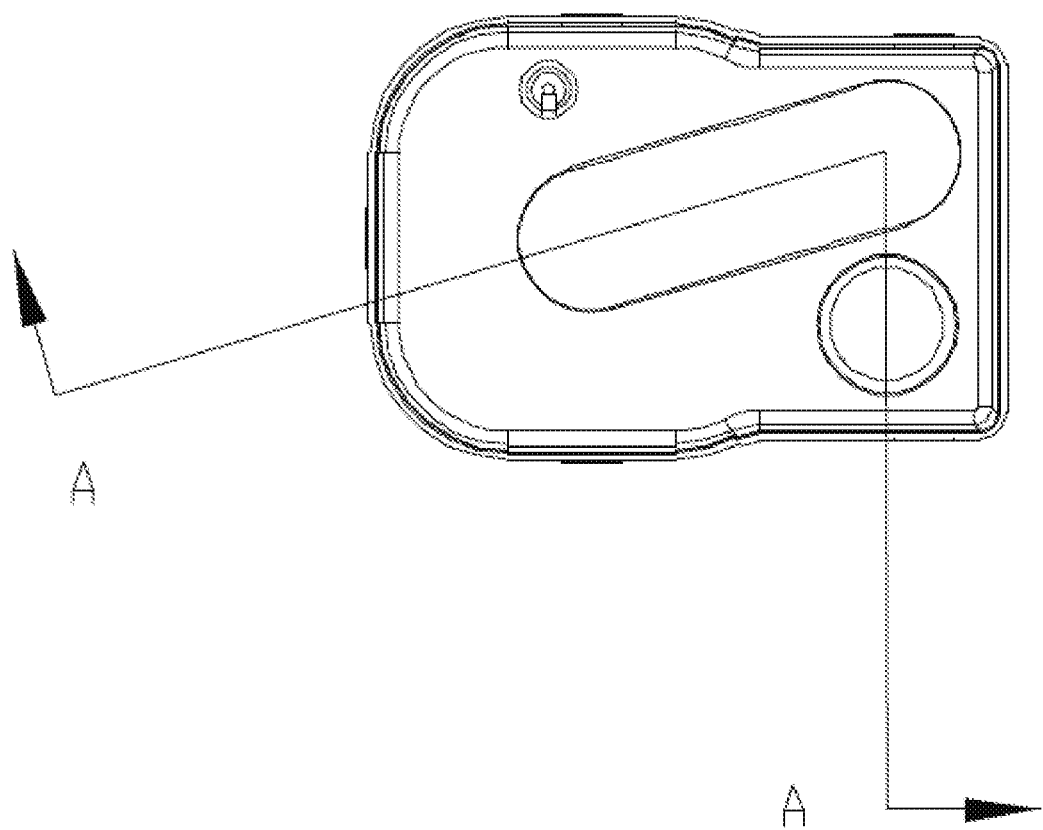
FIG. 2 is a bottom view showing the structure of the present invention.
Figure 3:
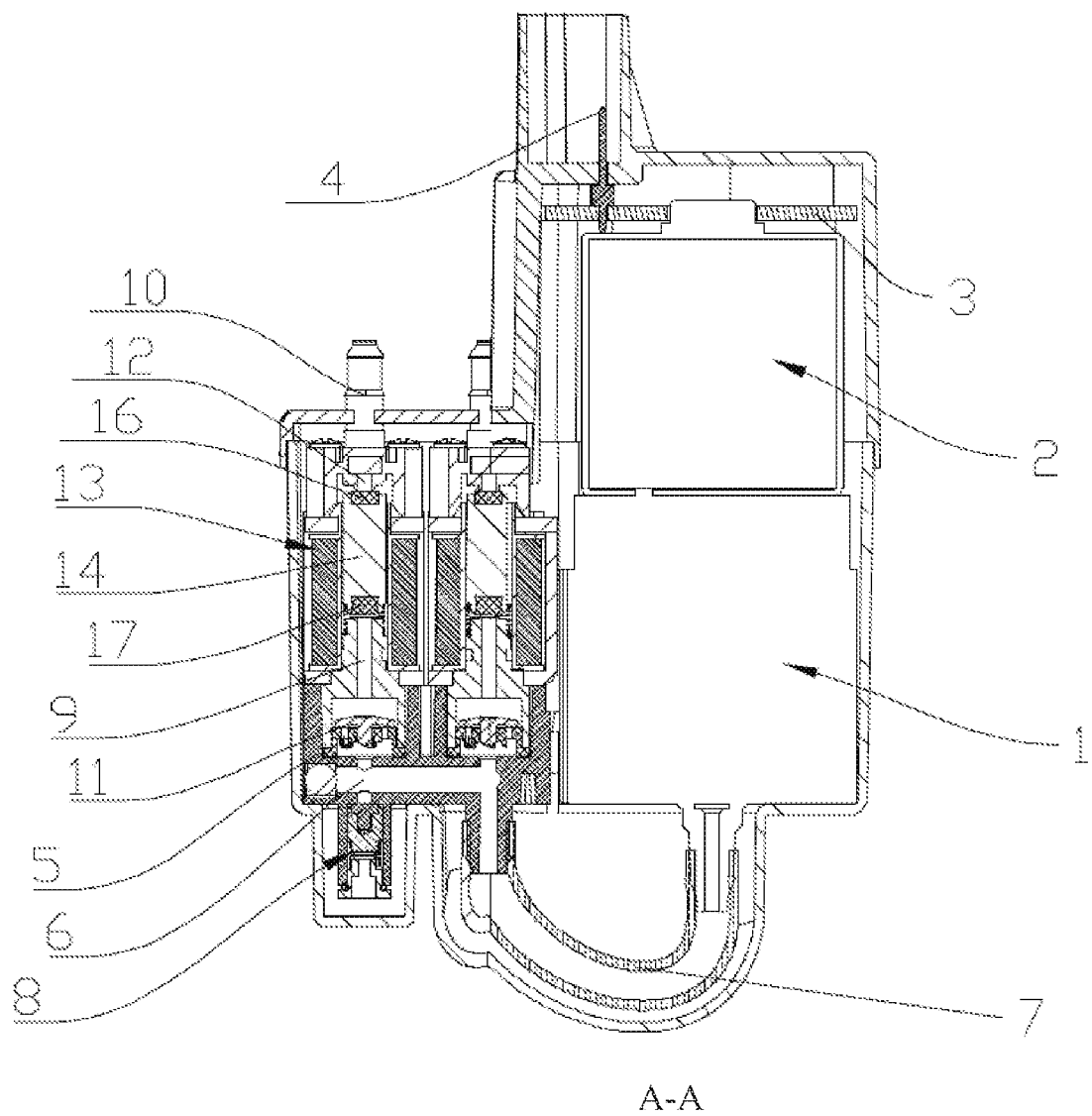
FIG. 3 is a hybrid sectional view and schematic view of the present invention taken along line A-A shown in FIG. 2, wherein the pump 1 and motor 2 are shown in schematic view.
Figure 4:
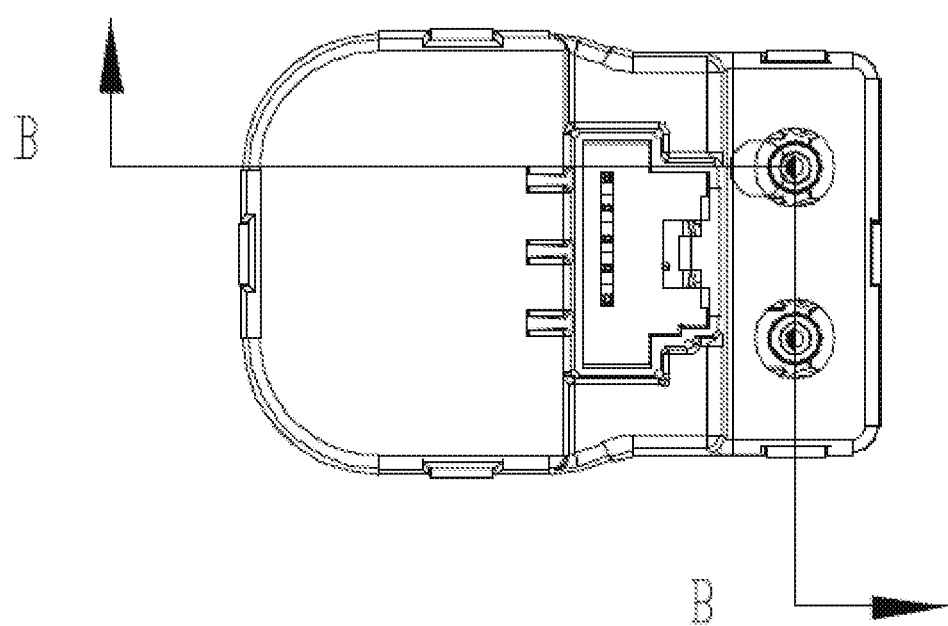
FIG. 4 is a top view showing the structure of the present invention.
Figure 5:
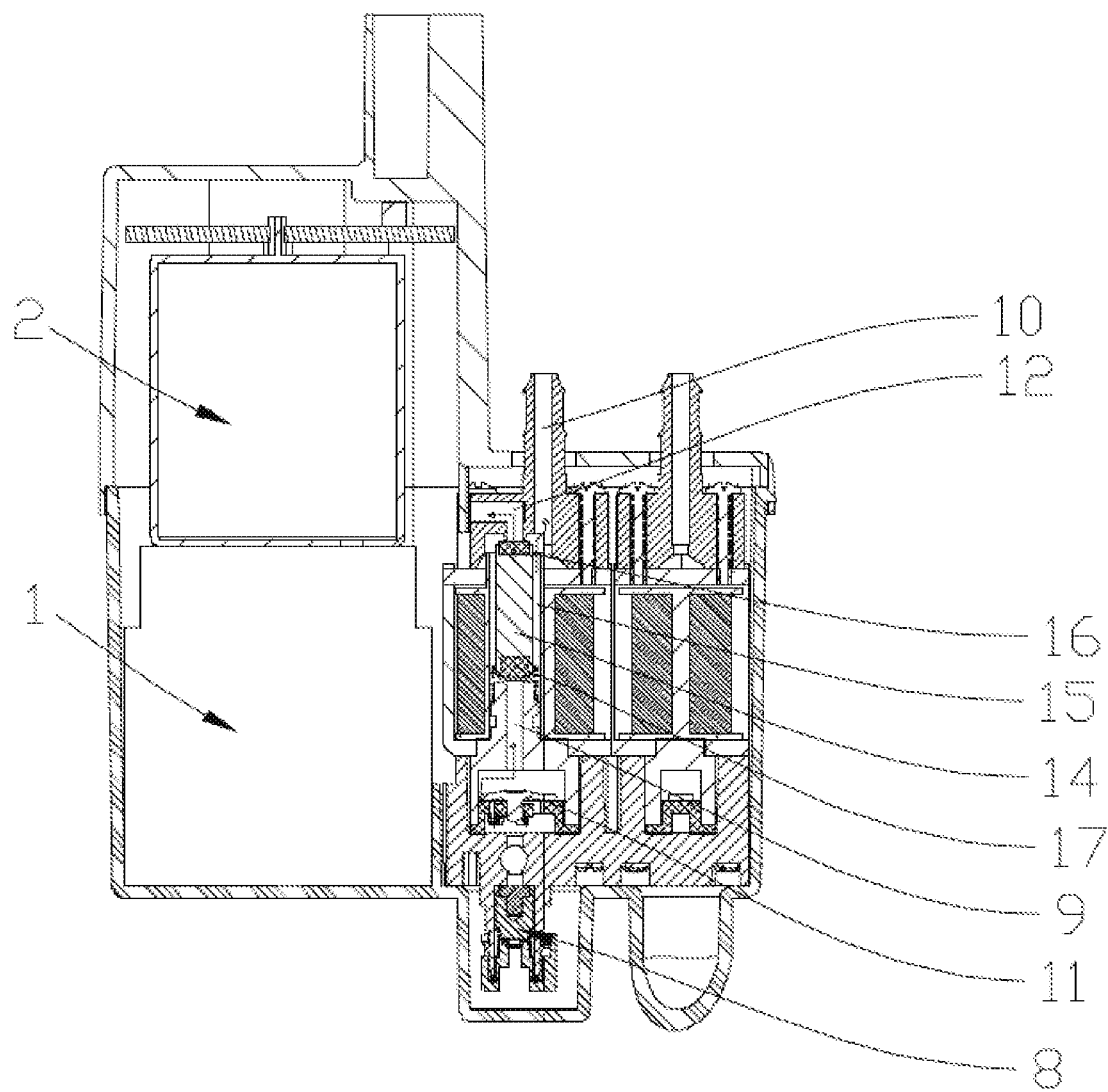
FIG. 5 is a hybrid sectional view and schematic view of the present invention taken along line B-B shown in FIG. 4, wherein the pump 1 and motor 2 are shown in schematic view.

The drawings illustrate the structure of the present invention, and the related details will be further illustrated hereinafter with reference to the drawings. The pump-valve integrated mechanism is installed in a shell body and includes the air pump 1. The air pump 1 is driven by a power source, the power source is the motor 2. The motor is provided above the air pump 1 with a driving connection. Correspondingly, the motor 2 is provided with the PCBA 3. The connecting plug pin 4 is provided on the PCBA 3. The air pump 1 is connected to the valve base 5. Preferably, the valve base 5 is provided on a side of the air pump 1 to achieve a reasonable arrangement and a compact structure. The main air channel 6 is provided inside the valve base 5. The main air channel 6 of the valve base 5 is connected to the air pump 1 through the U-shaped air pipe 7. The main air channel 6 is provided with the decompression structure 8. The decompression structure 8 is a decompression hole provided on the main air channel 6. The decompression hole is correspondingly provided with a decompression valve. The decompression valve controls the on and off of the decompression hole according to the air pressure in the main air channel 6. The main air channel 6 is connected to an air inflation structure. Preferably, at least two air inflation structures are provided which enables the inflation of a plurality of the airbags at the same time. The air inflation structure includes the branch air channel 9 and the air nozzle 10. An inner end of the branch air channel 9 is connected to the main air channel 6. An outer end of the branch air channel 9 is connected to the air nozzle 10. The check valve 11 is provided inside the branch air channel 9. The branch air channel 9 between the check valve 11 and the air nozzle 10 is provided with the air deflation hole 12. A soundproof foam is further provided in the air deflation hole 12 to reduce noise during air deflation. The electromagnetic valve 13 is provided between the air nozzle 10, the air deflation hole 12 and the check valve 11. The electromagnetic valve 13 is a three-way, two-position valve. During air inflation, the electromagnetic valve 13 controls the check valve 11 to become connected to the air nozzle 10, and the air deflation hole 12 is closed. During air deflation, the electromagnetic valve 13 controls the air nozzle to become connected to the air deflation hole 12, and the check valve 11 is closed.

The electromagnetic valve 13 includes the valve rod 14. The valve rod is controlled by an electromagnetic coil and a resetting spring and is movably provided in the branch air channel 9. Moreover, the gap 15 is provided between the valve rod and the branch air channel 9 for ventilation. Preferably, a cylindrical side surface of the valve rod is provided with a flat surface. Two ends of the valve rod are respectively provided with the upper sealing gasket 16 and the lower sealing gasket 17. The upper sealing gasket 16 is matched with the air deflation hole 12, and the lower sealing gasket 16 is matched with the check valve 11. Moreover, the upper sealing gasket 16 and the lower sealing gasket 17 are rubber gaskets.

The working principle of the present invention is as follows. The motor 2 drives the air pump 1 to perform the air inflation, the air enters the main air channel 6 via the U-shaped air pipe 7, and the air in the main air channel 6 inflates the airbag via the branch air channel 9, the check valve 11, and the air nozzle 10. At this time, the electromagnetic valve 13 controls the check valve 11 to become connected to the air nozzle 10, and the air deflation hole 12 is closed. While, when the electromagnetic valve 13 controls the air nozzle 10 to become connected to the air deflation hole 12, and the check valve 11 is closed, the air in the air bag is released via the air nozzle 10, the branch air channel 9, and the air deflation hole 12. When an air pressure in the main air channel 6 is excessive, the decompression structure 8 will work to relieve the pressure.

To conclude, the foregoing merely described the preferred embodiments of the present invention, which is not intended to limit the scope of the present invention. Any modification, equivalent substitution, or improvement made without departing from the spirit and principle of the present invention should be considered as falling within the scope of the present invention.

What is claimed is:

1. A pump-valve integrated mechanism comprises:
a power source; and
an air pump connected to a valve base and driven by the power source; and
the valve base having a main air channel and a decompression structure; and
an air inflation structure connected to the main air channel, wherein the air inflation structure further comprises, a branch air channel, an air nozzle, and an electromagnetic valve having a valve rod; and
wherein the branch air channel further comprises a check valve, an air deflation hole, and the valve rod; and
wherein in a first position the valve rod fluidly connects the check valve to the air nozzle and closes the air deflation hole, and
wherein in a second position the valve rod fluidly connects the air nozzle to the air deflation hole and closes the check valve.

2. The pump-valve integrated mechanism according to claim 1, wherein at least two air inflation structures are provided.

3. The pump-valve integrated mechanism according to claim 1, wherein the valve base is provided on a side of the air pump.

4. The pump-valve integrated mechanism according to claim 1, wherein the power source is a motor, the motor is provided above the air pump with a driving connection, the motor is provided with a printed circuit board assembly (PCBA), the PCBA is provided with a connecting pin.

5. The pump-valve integrated mechanism according to claim 1, wherein the main air channel of the valve base is connected to the air pump through a U-shaped air pipe.

6. The pump-valve integrated mechanism according to claim 1, wherein the decompression structure is a decompression hole provided on the main air channel, and the decompression hole is provided with a decompression valve.

7. The pump-valve integrated mechanism according to claim 1, wherein the valve rod is movably provided inside the branch air channel, a gap is provided between the valve rod and the branch air channel, two ends of the valve rod are respectively provided with an upper sealing gasket and a lower sealing gasket, the upper sealing gasket is matched with the air deflation hole, and the lower sealing gasket is matched with the check valve.

8. The pump-valve integrated mechanism according to claim 6, wherein a soundproof foam is provided inside the decompression hole.

* * * * *